UNITED STATES PATENT OFFICE.

STEPHEN P. M. TASKER, OF PHILADELPHIA, PENNSYLVANIA.

MANUFACTURE OF LEATHERY COMPOUND.

SPECIFICATION forming part of Letters Patent No. 322,996, dated July 28, 1885.

Application filed February 16, 1885. (No specimens.)

*To all whom it may concern:*

Be it known that I, STEPHEN P. M. TASKER, a citizen of the United States, residing in the city and county of Philadelphia, in the State of Pennsylvania, have invented a new and useful Article of Manufacture or Leathery Compound, and a method of producing the same, of which the following is a specification.

In the manufacture of leather from skins of animals, the process of tanning, as is well known, consists, essentially, in treating such skins with tannic acid derived from the bark of trees, whereby the gelatine of the skin is rendered insoluble.

The object of my invention is the production of a leathery substance by suitably compounding together gelatine and tannic acid, and supplying thereto suitable fiber to form the body of the same and to give sufficient strength and toughness thereto.

In the practice of my invention I employ fiber of any suitable kind, dependent upon the quality or kind of leathery compound to be made—for instance, hair of any kind, silk, cotton, wood fiber, wool, mineral wool, or asbestus; or other animal, vegetable, or mineral fiber may be resorted to for the purpose.

In carrying out my invention I dissolve a quantity of gelatine in water or other suitable solvent. In this gelatinous solution I submerge a quantity of fiber of any suitable kind, as above described; or said fiber may be otherwise treated with said solution until it has become fully saturated with the same. I then mold or work the gelatinized fiber into any desired form, and subject it to the action of tannic acid, whereby it becomes tanned, with the result that the gelatine between and around the fiber is formed into a leathery compound, and the fiber firmly bound together.

The proportions of fiber and gelatine which I have found to produce a good article are, by weight, one-fourth of gelatine to three-fourths of fiber. These proportions, however, may be varied according to the kind of fiber employed and the quality or kind of compound to be made. In most cases it will be found desirable to use no more gelatine than is sufficient to cause the fiber to be thoroughly coated and to adhere firmly together.

Of the fibers above mentioned I regard asbestus as especially desirable for use in the practice of my invention, by reason of its cheapness and indestructibility.

I do not confine myself to any precise method of mixing or aggregating the fiber and gelatine or of treating the same when mixed or aggregated with tannic acid; nor do I confine myself to the use of any specific kind of fiber, or to any given proportions of the materials to be employed in the manufacture of the article described.

I am aware that artificial leather has been made by treating cloth or fabric with albumen, ichthyocolla, extractive and fatty matter, and with tannic acid. I make no claims to such a process.

It is obvious that by my process the leathery compound may be worked or fashioned into any desired form, and may be used for a variety of purposes, such as for pump-valves, and for cups for packing.

Having thus described my invention, I claim—

The method of manufacturing a leathery compound which consists in treating fibrous material with gelatine, molding or working the same into the desired form, and in treating such worked, molded, or formed material with tannic acid, as specified.

In testimony whereof I have hereunto signed my name this 14th day of February, A. D. 1885.

STEPHEN P. M. TASKER.

In presence of—
WM. C. STRAWBRIDGE,
J. BONSALL TAYLOR.